United States Patent [19]

Lillig et al.

[11] 4,117,414
[45] Sep. 26, 1978

[54] SIGNAL CONDITIONING CIRCUIT

[75] Inventors: John E. Lillig, Diamond Bar; Richard C. Meyer, La Habra; Robert J. Anderson, Orange, all of Calif.

[73] Assignee: Beckman Instruments, Inc., Fullerton, Calif.

[21] Appl. No.: 812,868

[22] Filed: Jul. 5, 1977

[51] Int. Cl.[2] .............................................. H03F 1/26
[52] U.S. Cl. .................................. 330/149; 328/163; 328/165; 330/151
[58] Field of Search ................ 330/149, 151; 307/351; 328/163, 165; 325/474, 475, 476

[56] References Cited
U.S. PATENT DOCUMENTS 3,238,383  3/1966  Falk .................................. 328/165 X Primary Examiner—James B. Mullins
Attorney, Agent, or Firm—R. J. Steinmeyer; R. R. Meads; J. R. Shewmaker

[57] ABSTRACT

A signal conditioning circuit for extracting unipolar noise from an analog input signal by isolating the unipolar noise component and subtracting it from the input signal. The circuit includes a coupling capacitor receiving the analog signal and an ideal clamp connected to the capacitor output terminal to clamp the capacitor to an edge of the unipolar noise signal. The capacitor is thus prevented from charging toward a level representing an average value of the unipolar noise and hence functions to pass the noise undistorted for subtraction from the analog input signal. The clamp comprises an operational amplifier having a first input terminal connected to the capacitor output terminal and a second input terminal connected to a source of reference voltage. A diode is connected in a feedback path between an output terminal of the amplifier and the first input terminal thereof.

1 Claim, 3 Drawing Figures

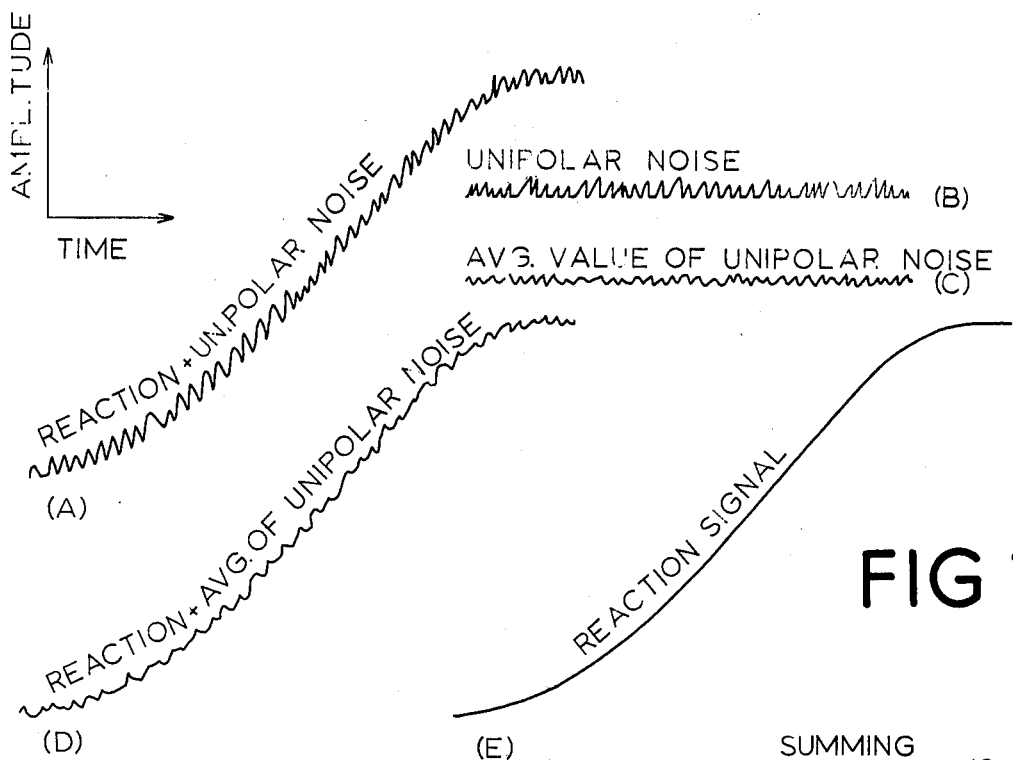
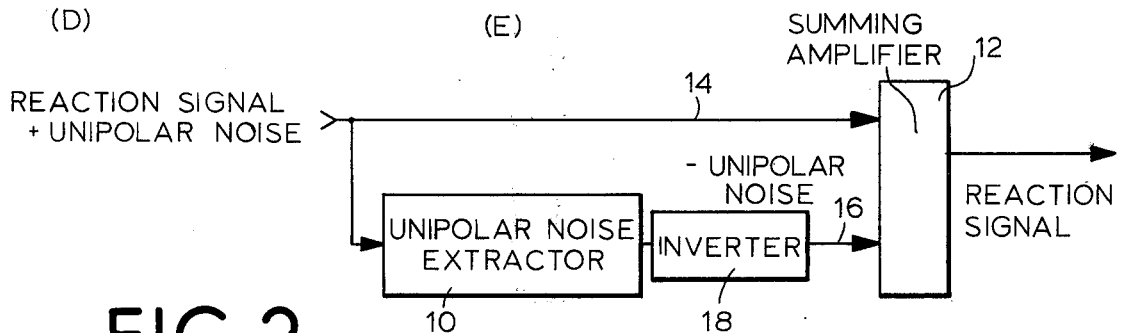
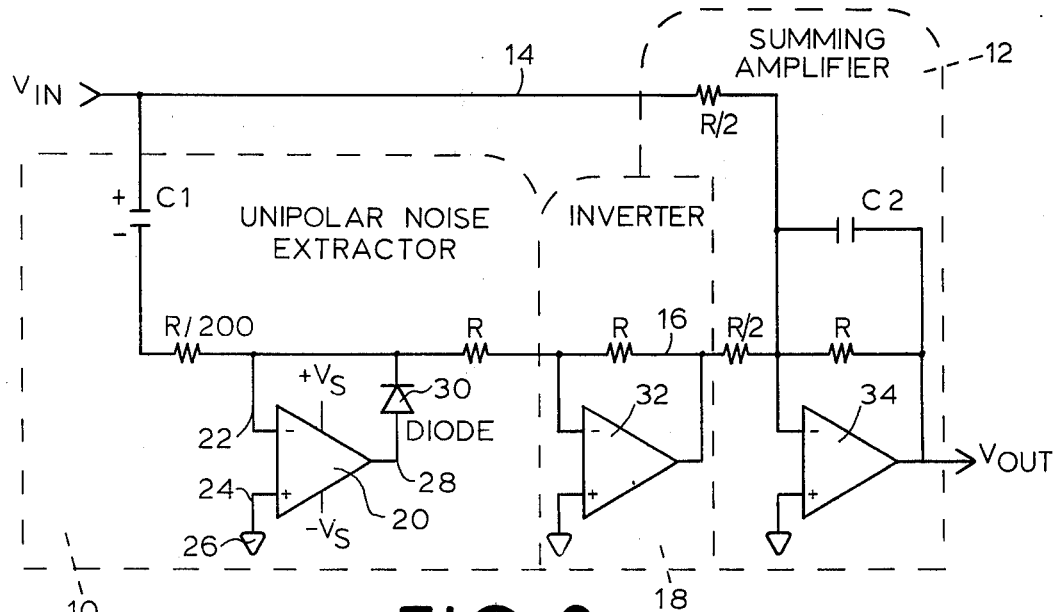

SIGNAL CONDITIONING CIRCUIT

BACKGROUND OF THE INVENTION

1. Field of the Invention

The present invention relates generally to analog signal conditioning circuits and, more particularly, to conditioning circuits for removing noise components from an analog signal.

2. Description of the Prior Art

Copending U.S. patent application Ser. No. 796,621 (Anderson et al.), filed May 16, 1977, discloses a nephelometric system which measures the rate of change of a scattered light signal generated as a precipitate is formed during an antigen-antibody reaction. In such a system, a light beam is directed at a reaction zone and a detector monitors the light scattered by the precipitate. The precipitate is formed as the reaction proceeds, and the detected light scatter signal increases correspondingly in analog fashion with precipitate formation. It has been found that movement of certain particles in the reaction zone, such as air bubbles, dust, or even precipitate, will momentarily increase the amount of light scattered by the reaction. The momentary increases in light scatter add positive "unipolar" noise spikes on the fundamental analog scatter signal. Unless removed, the unipolar noise component of the analog output signal will introduce inaccuracies in the measurement.

In the past, efforts to remove unipolar noise components have employed high pass filters or the like to isolate the noise component of the analog signal. After isolation, the noise component is subtracted from the analog signal (i.e. is typically inverted and added to the signal to derive an output analog signal free to the noise component). Unfortunately, while such high pass filtering techniques can successfully isolate the high frequency term of the unipolar noise, they neglect the average level term of the unipolar noise. In this regard, such filters typically employ a coupling capacitor to extract the noise component. The capacitor charges to the average level of the noise component. The resulting noise signal component subtracted from the analog signal therefore excludes the average level term of the noise component so that a summing error is introduced in the output analog signal to the extent of the average level term.

SUMMARY OF THE INVENTION

The present invention resides in a new and improved signal conditioning circuit for extracting unipolar noise from an analog signal without neglecting the average level term of the unipolar noise. To this end, the invention contemplates a signal conditioning circuit including a coupling capacitor having input and output terminals and clamping means connected between the capacitor output terminal and a source of reference voltage. The clamping means, comprising an operational amplifier and a diode, prevents the coupling capacitor from charging toward the average value of the unipolar noise component. In this regard, the inverting input terminals of the amplifier is coupled to the output terminal of the coupling capacitor and the noninverting input terminaL of the amplifier is connected to a source of reference voltage (e.g. ground). The diode is configured to be reverse biased by the unipolar noise component and is connected in a feedback path between an output terminal of the operational amplifier and the inverting input terminal. The amplifier and diode cooperate to clamp the output terminal of the capacitor at ground which prevents the capacitor from charging to the average level of the unipolar noise. With such an arrangement, all high frequency unipolar spikes are passed by the coupling capacitor undistorted for subtraction from the analog signal.

BRIEF DESCRIPTION OF THE DRAWINGS

FIG. 1 is a graphical representation of various signal waveforms plotted as voltage versus time. Waveform A illustrates a typical nephelometric reaction signal having unipolar noise superimposed thereon. Waveform B illustrates the unipolar noise alone. Waveform illustrates the average value of the unipolar noise. Waveform D illustrates the same reaction signal wth the average of the unipolar noise superimposed thereon. Waveform E illustrates the true reaction signal.

FIG. 2 is a block diagram of the signal conditioning circuit of the present invention.

FIG. 3 is a schematic diagram of FIG. 2.

DESCRIPTION OF THE PREFERRED EMBODIMENT

Referring now to the drawing, FIG. 1 illustrates typical voltage waveforms found in a nephelometric analyzer for measuring precipitate formation in antigen-antibody reactions. As previously explained, such analyzers measure the light scattered during formation of the precipitate. Ideally, the light scatter signal gradually increases from a zero value in the manner illustrated in Waveform E. However, as pointed out in the Background, air bubbles, dust particles and the like in te reaction vessel frequently intercept the light beam causing a momentary increase in the scattered light signal. Such momentary increases represent unipolar noise spikes, as illustrated in Waveform B, which when superimposed on the analog reaction signal produce a composite signal as illustrated in Waveform A. As noted previously, prior attempts to extract the unipolar noise with filtering techniques neglected the average value of the unipolar noise, such average value being depicted in Waveform C. As a result, the resulting reaction signal included this average value term and appeared as in Waveform D.

Referring now to FIG. 2, the signal conditioning circuit of the present invention includes a unipolar noise extractor 10 for isolating the unipolar noise cmponent from the analog reaction signal and an arrangement for subtracting the unipolar noise from the combined reaction and noise signal. The illustrated arrangement includes a summing amplifier 12 which receives the combined reaction and unipolar noise input signal at a first input terminal 14. The summing amplifier also receives at a second input terminal 16 the isolated unipolar noise signal after inversion by inverter 18. The summing amplifier operates to subtract the unipolar noise from the combined reaction and unipolar noise signal to supply an output signal representing the true reaction signal free of the unipolar noise component.

Referring now to the schematic of FIG. 3, the unipolar noise extractor 10 includes a coupling capacitor C1 having an input terminal connected to receive the combined reaction and unipolar noise signal, hereinafter $V_{in}$. $V_{in}$ is also supplied to the first input terminal 14 of summing amplifier 12.

The unipolar noise extractor 10 further includes an operational amplifier 20 having an inverting input terminal 22 and a noninverting input terminal 24. The input terminal 22 is connected through a resistor R/200 to the output terminal of coupling capacitor C1 while the input terminal 24 is connected to a source of reference voltage 26 such as ground. An output terminal 28 of the operational amplifier is connected to a diode 30 in a negative feedback path back to the input terminal 22. Conventional supply voltage terminals of amplifier 20 are connected across a source of supply voltage $\pm V_s$.

The output from the unipolar noise extractor 10 is taken from a junction of diode 30, resistor R/200 and input terminal 22. The junction is coupled through a resistor R to inverter 18.

Inverter 18 and summing amplifier 12 are of conventional design. As illustrated, the inverter comprises an operational amplifier 32 having a noninverting input terminal connected to reference voltage source 26 and a resistor R in a feedback path from the output terminal and the inverting input terminal of the amplifier. The summing amplifier includes an operational amplifier 34 having a parallel combination of resistor R and capacitor C2 in a feedback path between output and inverting input terminals. Signal $V_{in}$ and the inverted (i.e. negative) unipolar noise signal from inverter 32 are coupled through separate resistors R/2 to the inverting input terminal of amplifier 34.

The unipolar noise extractor of the invention operates in the following manner. It is assumed for discussion purposes that the unipolar noise is positive. On application of analog input voltage $V_{in}$, any positive unipolar noise thereon is coupled through capacitor C1 to the junction of inverting input terminal 22 of operational amplifier 20 and the negative terminal of diode 30. Diode 30 is configured in a direction to be reverse biased by positive unipolar noise. When so biased, diode 30 and hence operational amplifier 20, are effectively disconnected from the circuit and positive unipolar noise is passed undistorted to the inverter 18 and summing amplifier 12.

When the operational amplifier 20 is not disconnected as described above (as in response to negative going signals), it attempts to drive any voltage difference between input terminals 22 and 24 to zero. Consequently, operational amplifier 20 and diode 30 cooperate to clamp the output terminal of coupling capacitor C1 at ground for negative going signals and the output terminal of coupling capacitor C1 is prevented from charging to the average level of the unipolar noise component. Thus, in practice, the amplifier 20 and diode 30 are in essence an ideal diode clamp. In this regard, the usual voltage drop across the diode (i.e. 0.7v) is effectively reduced, due to the gain of the operational amplifier, to about one hundredth (i.e. 0.7mv) of its normal level.

With the output terminal of capacitor C1 thus clamped to essentially ground level for negative going signals, the positive unipolar noise is coupled thereby undistorted to inverter 18 and summing amplifier 12 which together function to subtract (i.e. invert and sum) the unipolar noise from the input analog signal. The ouput analog signal supplied thereby is free of the average level noise term and hence the output signal takes the form illustrated in FIG. 1E. In effect the unipolar noise extractor functions as an edge follower in that it follows the negative edge of the unipolar noise enabling the noise to be removed entirely.

While the unipolar noise extractor 10 has been illustrated for use with positive unipolar noise signals, it can be employed for signals having negative unipolar noise by simply reversing the polarity of diode 30. In such case the circuit would function as a positive edge follower. If bipolar noise were encountered, only one half (either positive or negative) would be removed.

While the values of the circuit components may vary widely depending on the nature of the application and type of analog signal being measured, in one successfully operated circuit representative values were:

| | |
|---|---|
| Capacitors C1 and C2 | 2 μf |
| Resistors R | 200 K ohm |
| Resistors R/2 | 100 K ohm |
| Resistor R/200 | 1 K ohm |
| Operational Amplifiers 20, 32, 34 | LM324 (National Semiconductor) |
| Supply Voltage $\pm V_s$ | $\pm 12$ V |
| Analog Voltage $V_{in}$ | $\pm(0.5$ to $10.0)$v |

From the foregoing, it will be evident that the unipolar noise extractor of the invention extracts the unipolar noise component of an analog signal without neglecting the average value term of the noise component. As a result, the circuit of the invention is capable of significantly increasing the signal to noise ratio of systems degraded by unipolar noise. Moreover, while the preferred embodiment of the invention has been illustrated and described, it will be apparent that modifications may be made therein without departing from the invention as defined in the appended claim.

We claim:

1. A signal conditioning circuit for extracting unipolar noise from an analog input signal comprising:
    a coupling capacitor having an input terminal receiving said analog signal and an output terminal for supplying a signal corresponding to a unipolar noise component of said analog signal;
    clamping means connected between said capacitor output terminal and a source of reference voltage for preventing said output terminal of said coupling capacitor from charging toward a voltage level representing an average value of said unipolar noise component, said clamping means including
        an operational amplifier having inverting and noninverting input terminals and an output terminal, said noninverting input terminal connected to the output terminal of said coupling capacitor and said inverting input terminal connected to a source of reference voltage, and
        a diode connected in a feedback path between the output terminal of said operational amplifier and the inverting input terminal thereof, said diode oriented in a direction to be reverse biased by said unipolar noise component; and
    means coupled to receive said analog input signal and said unipolar noise component signal for subtracting the latter from the former to supply an analog output signal free of said unipolar noise component.

* * * * *